UNITED STATES PATENT OFFICE.

NATHAN SULZBERGER, OF NEW YORK, N. Y.

SOLUBLE CATALYTIC AGENTS AND PROCESS OF MAKING THE SAME.

1,171,902.   Specification of Letters Patent.   Patented Feb. 15, 1916.

No Drawing.   Application filed January 10, 1914. Serial No. 811,395.

*To all whom it may concern:*

Be it known that I, NATHAN SULZBERGER, born in New York city, and a citizen of the United States, residing at New York city, in the county and State of New York, have invented new and useful Improvements in Soluble Catalytic Agents and Processes of Making the Same, of which the following is a specification.

It is most important in the many varied purposes, for which catalyzers are used, that such catalytic agents be most intimately mixed and distributed throughout the product, reaction upon which is desired. A common method often employed to accomplish this is to increase the surface of such agents by impregnating certain inert material such as asbestos, kieselguhr, kaolin, etc. This method besides requiring time and labor is also disadvantageous, since it makes it necessary to deal with very large and bulky quantities of material.

I have found that the most efficient way of intimately distributing a catalyzer (or a product, which may readily be rendered catalytically efficient) is by dissolving the same in the body, which is to be treated, and then—should not the form, in which the catalyzer was dissolved in the body, be *per se* catalytically active—transforming same by chemical reaction or otherwise into a product of catalytical efficiency. As an example I will cite the hydrogenization—hardening—of cotton-seed-oil with a catalytic agent belonging to the platinum group: palladium. It is a well-known fact, that palladium is especially valuable in this connection, but in order to follow out the ideas of my invention I must look for such form of a palladium-connection (a salt or other body), as will be soluble in the compound which is to be catalytically treated, viz.: cotton-seed-oil. I found, that a palladium product of the desired quality can be obtained by treating a palladium-salt, as for instance "palladium-ammonium-chlorid" with sodium-oleate, which resulting compound is soluble in cotton-seed-oil and can be used as a catalyzer of highest efficiency, by my method being so finely divided in the oil, that even very small quantities will give desired results. The solution of this product in the oil darkens when heated, in consequence of its palladium content and such solution hardens to a product of jelly-like consistency (perhaps a colloidal state), at certain temperatures and when containing certain amounts of the palladium-body. Cotton-seed-oil, when containing this body in its yellowish oily condition or after the same has darkened, is readily hardened, when treated with hydrogen. The yellowish oil may be added directly to the quantity of the cotton-seed-oil, when the solution will become dark either by heating alone or during the action of the hydrogen. The yellowish oil may on the other hand also be added first to a small portion of the cotton-seed-oil and this portion, either before or after it has become dark by heating or otherwise, can be added to the whole quantity of the cotton-seed-oil, which is to be treated.

In cases, where the product, which is to act as a catalyzer, cannot be made use of in a condition, in which the same is soluble in the material, which is to be treated catalytically, the very fine distribution of the catalytic agent may be accomplished by dissolving the same in a solvent, which mixes with the body, which is to be treated, with or without precipitation (or change of any kind). For example, the above palladium-compound being soluble in ether, could be added to the cotton-seed-oil in such solution.

My above described method of finely distributing catalytically valuable substances, since in most cases less of such substance is required is also technically cheaper. Other metals and substances of catalytical action and which are soluble in the product, which is to be treated, or can be added to the same in a solution for all purposes, where catalytical action is desired, come under the scope of this invention.

I claim:

1. Process for making a catalyst, which comprises treating the solution of an oleate with the solution of a derivative of a metal belonging to the platinum-group in the absence of added material to preserve the colloidal state of the formed metal-oleate and which will prevent such metal-oleate from depositing its platinum-metal in a catalytic active state at a temperature of 50° C. or less.

2. Process for making a catalyst, which comprises treating the solution of an oleate with the solution of a palladium-derivative in the absence of added material to preserve the colloidal state of the formed palladium-oleate and which will prevent such palladium-oleate from depositing its palladium-metal in a catalytic active state at a temperature of 50° C. or less.

3. Derivative of oleic acid and a metal belonging to the platinum-group free from added material to preserve the colloidal state and which will prevent said derivative from depositing its metal at a temperature of 50° C. or lower, representing at ordinary temperature a yellowish oil, insoluble in water, soluble in ether, fats and oils and which spontaneously decomposes, becoming dark by precipitating its metal content.

4. Derivative of oleic acid and palladium free from added material to preserve its colloidal state and which will prevent said derivative from depositing its palladium at a temperature of 50° C. or less, representing at ordinary temperature a yellowish oil, insoluble in water, soluble in ether, fats and oils and which spontaneously decomposes and becomes dark by precipitating its palladium-content.

Berlin, December 29th, 1913.

NATHAN SULZBERGER.

Witnesses:
 HENRY HASPER,
 WOLDEMAR HAUPT.